(12) United States Patent
Huang et al.

(10) Patent No.: US 11,746,841 B2
(45) Date of Patent: Sep. 5, 2023

(54) ANTI-DRAG STRUCTURE OF AUTOMOBILE BRAKE CALIPERS

(71) Applicant: CSG TRW Chassis Systems CO., LTD, Chongqing (CN)

(72) Inventors: Liang Huang, Chongqing (CN); Peng Jiang, Chongqing (CN)

(73) Assignee: CSG TRW Chassis Systems CO., LTD, Chongqing (CN)

( * ) Notice: Subject to any disclaimer, the term of this patent is extended or adjusted under 35 U.S.C. 154(b) by 77 days.

(21) Appl. No.: 17/239,465

(22) Filed: Apr. 23, 2021

(65) Prior Publication Data
US 2021/0332863 A1 Oct. 28, 2021

(51) Int. Cl.
| | |
|---|---|
| *F16D 55/18* | (2006.01) |
| *F16D 65/00* | (2006.01) |
| *F16D 65/18* | (2006.01) |
| F16D 121/04 | (2012.01) |
| F16D 125/04 | (2012.01) |
| F16D 125/08 | (2012.01) |

(52) U.S. Cl.
CPC ......... *F16D 65/0068* (2013.01); *F16D 65/18* (2013.01); *F16D 2121/04* (2013.01); *F16D 2125/04* (2013.01); *F16D 2125/08* (2013.01); *F16D 2200/003* (2013.01); *F16D 2200/0034* (2013.01); *F16D 2250/0061* (2013.01)

(58) Field of Classification Search
CPC .. F16D 65/18; F16D 65/0075; F16D 65/0068; F16D 2200/0034; F16D 2125/08; F16D 2121/04; F16D 2200/003; F16D 2250/0046; F16D 2125/04; F16D 2250/0061

USPC ....... 188/72.3–72.5; 277/169, 171, 177, 468, 277/482, 584, 589
See application file for complete search history.

(56) References Cited

U.S. PATENT DOCUMENTS

| | | | | |
|---|---|---|---|---|
| 4,336,746 | A | * | 6/1982 | Morith ..................... F16D 65/14 92/130 B |
| 4,382,492 | A | * | 5/1983 | Ritsema ................... F16D 65/54 188/196 P |
| 4,386,682 | A | * | 6/1983 | Woo ......................... F16D 65/54 192/111.1 |
| 5,090,519 | A | * | 2/1992 | Golea ....................... F16D 65/18 403/291 |
| 7,191,875 | B2 | * | 3/2007 | Kurimoto .............. F16J 15/164 277/587 |

(Continued)

*Primary Examiner* — Christopher P Schwartz
(74) *Attorney, Agent, or Firm* — Michael D. Eisenberg

(57) ABSTRACT

The present invention relates to an anti-drag structure of automobile brake calipers, comprising a brake caliper body which is provided with a cylinder bore and a brake claw arranged along the axis of the cylinder bore in an extending mode; and a cylindrical piston bush is pressed in the cylinder bore by interference fit, a step ring groove is formed in the inner wall of the piston bush and composed of a major diameter ring groove and a minor diameter ring groove which have rectangular sections. The present invention can improve the generality of the brake caliper body through the arrangement of the piston bush and improve the standardization of production manufacturing of brake calipers, and can reduce the residual drag moment of the brake caliper and the fuel consumption with the rubber seal ring and the phenolic resin PF ring to achieve the purpose of emission reduction.

4 Claims, 3 Drawing Sheets

(56) References Cited

U.S. PATENT DOCUMENTS

| | | | |
|---|---|---|---|
| 8,225,910 B2* | 7/2012 | Piccoli | F16D 65/18 |
| | | | 188/196 A |
| 8,376,101 B2* | 2/2013 | Crippa | F16D 65/18 |
| | | | 188/72.3 |
| 9,388,870 B2* | 7/2016 | Cesani | F16D 65/18 |
| 2019/0085926 A1* | 3/2019 | Siegrist | F16D 65/54 |

* cited by examiner

ANTI-DRAG STRUCTURE OF AUTOMOBILE BRAKE CALIPERS

CROSS-REFERENCES TO RELATED APPLICATIONS

This application claims priority from Chinese Application Serial Number CN202010334127.2 filed Apr. 24, 2020, which is hereby incorporated herein by reference in its entirety.

FIELD OF INVENTION

The present invention belongs to the technical field of automobile brake, and particularly relates to an anti-drag structure of automobile brake calipers.

BACKGROUND ART OF THE INVENTION

Brake calipers are mostly used in automobile caliper disc brakes, and different brake cylinder diameters are matched according to different vehicle parameters in use. At present, the automobile technology is developing towards low emission and high performance, the vehicle parameters of most of vehicles are different, resulting in different brake cylinder diameters of the automobile brake calipers, and thus the specifications of the automobile brake calipers are increasing, the manufacture is inconvenient, and the cost is high.

In addition, the requirements for the residual drag moment of the automobile brake are becoming higher and higher with the development, and the traditional design scheme cannot balance the performance requirement of the lag moment of the automobile brake under the hydraulic condition exceeding 3 Mpa and the more stringent indicators of fluid demand and drag moment. The traditional design scheme leads to higher development cost and increased development risk for automobile brake suppliers in view of low drag requirements extended from diversification of cylinder diameter specifications of brake calipers and increasingly stringent emission requirements.

Now the automobile has been further developed to platformization, unification and low emission. It is imperative to optimize the structure of automobile brake calipers, improve the performance of automobile brakes, reduce the automobile drag moment to reduce fuel consumption, and further shorten the automobile development cycle, reduce the product management risk mode, reduce cost and increase benefit.

DISCLOSURE OF THE INVENTION

In view of this, the purpose of the present invention is to provide an anti-drag structure of automobile brake calipers, which avoids the problems that specifications are not convenient to unify and the drag moment is large under the operating condition of high hydraulic pressure, thereby achieving the effects of improving generality and reducing emission.

To achieve the above purpose, the present invention provides the following technical solution:

An anti-drag structure of automobile brake calipers comprises a brake caliper body which is provided with a cylinder bore and a brake claw arranged along the axis of the cylinder bore in an extending mode; a cylindrical piston bush is pressed in the cylinder bore by interference fit, a step ring groove is formed in the inner wall of the piston bush and composed of a major diameter ring groove and a minor diameter ring groove which have rectangular sections, the major diameter ring groove is embedded with a rubber seal ring with the section corresponding to the major diameter ring groove, the minor diameter ring groove is embedded with a phenolic resin PF ring with the section corresponding to the minor diameter ring groove, and the inner edge of the end face of the phenolic resin PF ring jointed with the rubber seal ring is provided with a chamfer.

Further, the brake caliper body is an aluminum alloy part, and the outer surface of the brake caliper body is attached with an anodic oxidation layer.

Further, the step ring groove is formed in one end of the piston bush near the brake claw, and the minor diameter ring groove embedded with the phenolic resin PF ring is arranged in one side near the brake claw in the step ring groove.

Further, the phenolic resin PF ring is provided with an assembly opening breaking the circumferentially continuous phenolic resin PF ring for the convenience of assembly.

The present invention has following beneficial effects:

1. The anti-drag structure of automobile brake calipers of the present invention improves the generality of the brake caliper body through the arrangement of the piston bush, the brake caliper body can be general for the requirement of different cylinder diameters by only replacing a piston bush with a different inner diameter, and the unification and platformization of production manufacturing of the brake caliper body are improved, thereby reducing the cost.

2. The anti-drag structure of automobile brake calipers of the present invention uses the rubber seal ring that is made of rubber and can elastically deform under pressure and the phenolic resin PF ring that is made of high hydraulically sensitive phenolic resinous material at high pressure, and the phenolic resin PF ring has the characteristics of stability at low hydraulic pressure and linear step at the pressure reaching the high hydraulic critical value, is stable at low pressure, and reaches high slope compression at high hydraulic pressure exceeding 30 bar. In use, the elastic potential energy of the rubber seal ring can be stored through the chamfer at the end face of the phenolic resin PF ring jointed with the rubber seal ring to trigger material characteristics at high hydraulic pressure, and the phenolic resin PF ring is linearly compressed and elastically deforms in a stepped mode, which can increase the deformation amount of the rubber seal ring and store more elastic potential energy of the rubber seal ring so as to reduce the residual drag moment of the automobile brake and the fuel consumption, thereby achieving the purpose of emission reduction.

3. The anti-drag structure of automobile brake calipers of the present invention is used in combination with the piston bush made of high-strength aluminum alloy and anodized to improve wear resistance, which is beneficial to improvement of the life and safety of brake calipers and is conducive to lightweight design.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

Figure 1:
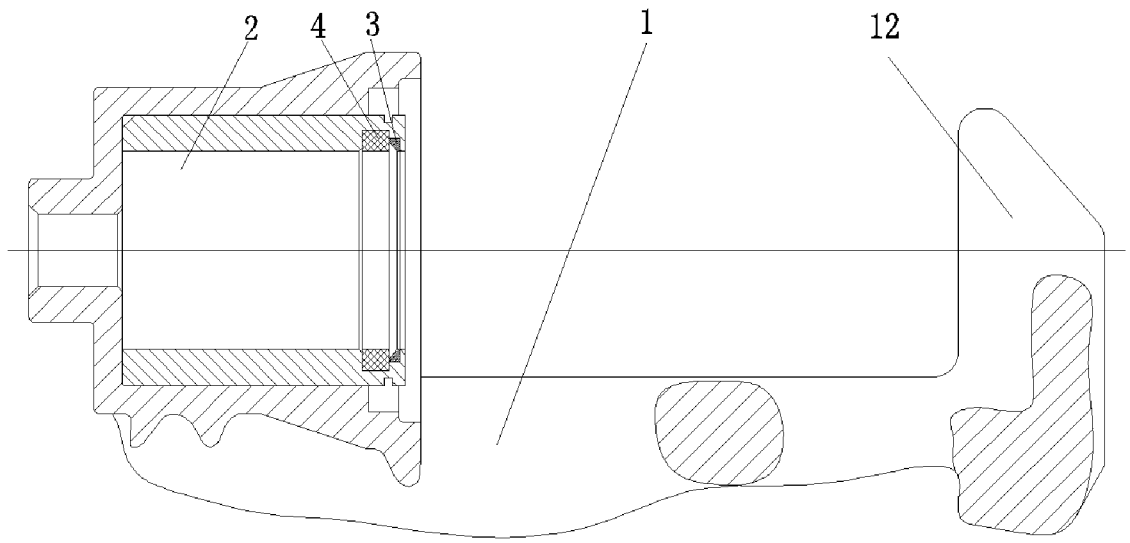
FIG. 1 is a structural schematic diagram of an anti-drag structure of automobile brake calipers of a specific embodiment.

REFERENCE SIGNS brake caliper body 1, cylinder bore 11, brake claw 12, step aperture 13, piston bush 2, step ring groove 21, major diameter ring groove 22, minor diameter ring groove 23, phenolic resin PF ring 3, chamfer 31, assembly opening 32, and rubber seal ring 4.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference signs in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Figure 2:
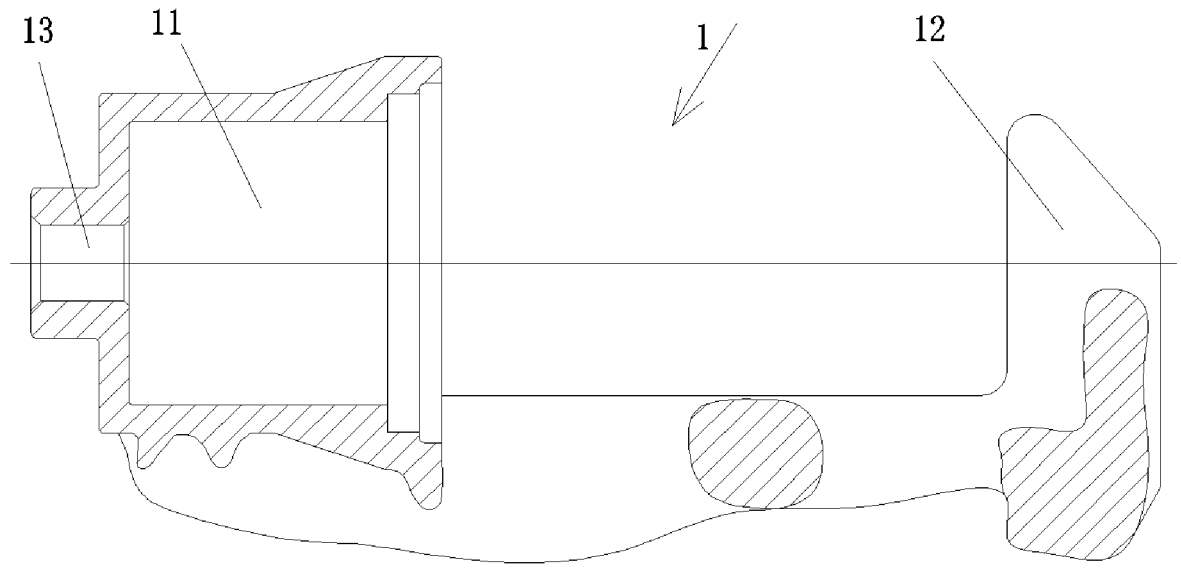
FIG. 2 is a single schematic diagram of a brake caliper body in a specific embodiment.
Figure 3:
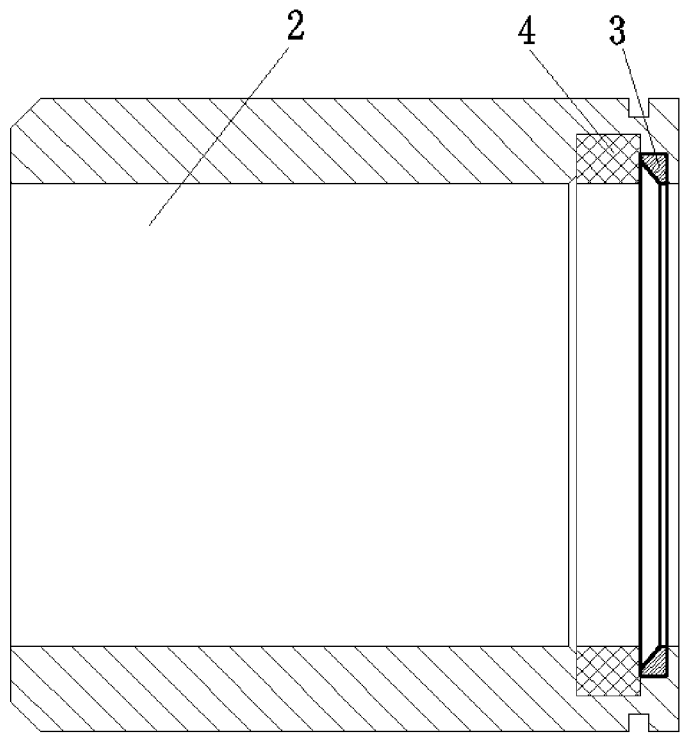
FIG. 3 is an assembly diagram of a piston bush and internal assembly parts in a specific embodiment.
Figure 4:
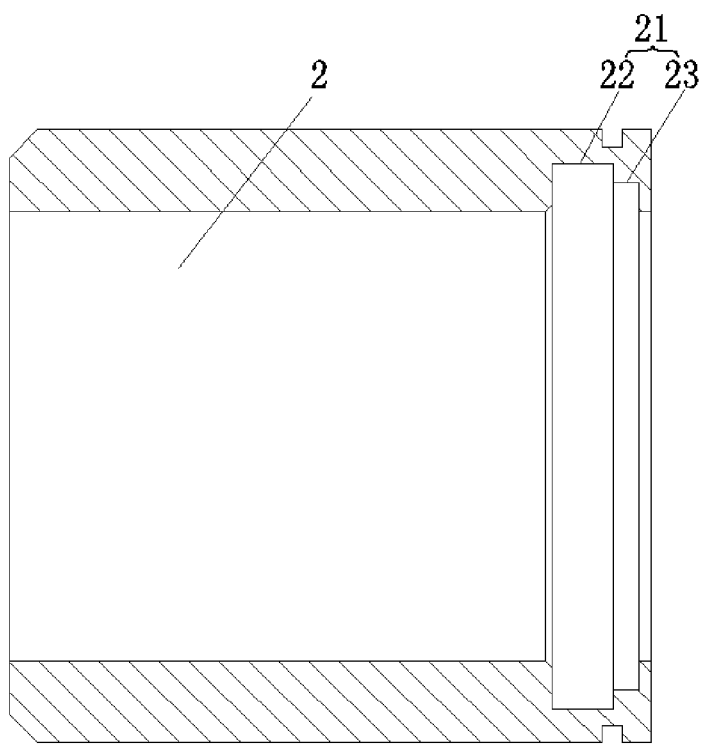
FIG. 4 is a single schematic diagram of a piston bush in a specific embodiment.
Figure 5:
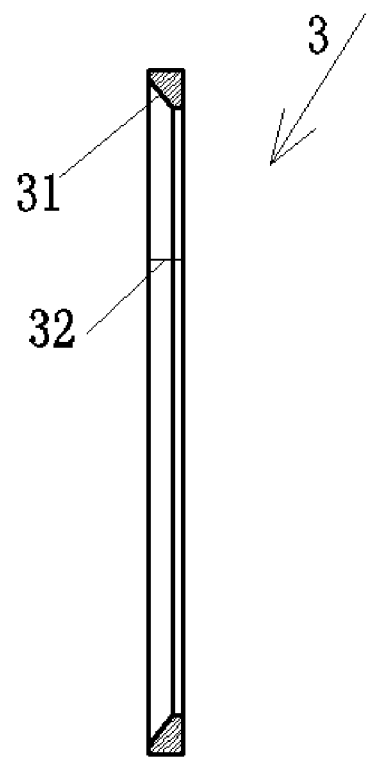
FIG. 5 is a single schematic diagram of a phenolic resin PF ring in a specific embodiment.
Figure 6:
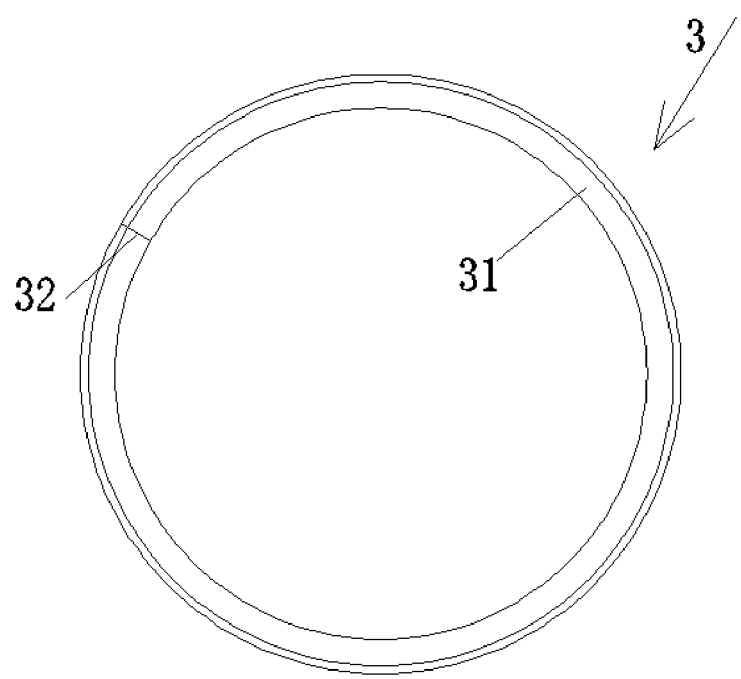
FIG. 6 is a left view of FIG. 5.

As shown in FIG. 1 to FIG. 6, an anti-drag structure of automobile brake calipers comprises a brake caliper body 1 which is provided with a cylinder bore 11 and a brake claw 12 arranged along the axis of the cylinder bore 11 in an extending mode; and the structure of the brake caliper body 1 is the prior art. Understandably, a step aperture 13 coaxial with the cylinder bore 11 is formed in one end of the cylinder bore 11 away from the brake claw 12 on the brake caliper body 1 for a piston rod to penetrate, a cylindrical piston bush 2 is pressed in the cylinder bore 11 by interference fit, a step ring groove 21 is formed in the inner wall of the piston bush 2 and composed of a major diameter ring groove 22 and a minor diameter ring groove 23 which have rectangular sections, the major diameter ring groove 22 is embedded with a rubber seal ring 4 with the section corresponding to the major diameter ring groove 22, i.e., the section of the rubber seal ring 4 is also rectangular, the minor diameter ring groove 23 is embedded with a phenolic resin PF ring 3 with the section corresponding to the minor diameter ring groove 23, and the inner edge of the end face of the phenolic resin PF ring 3 jointed with the rubber seal ring 4 is provided with a chamfer 31 to make the section in a shape similar to a right trapezoid.

The anti-drag structure of automobile brake calipers of the embodiment improves the generality of the brake caliper body 1 through the arrangement of the piston bush 2, the brake caliper body 1 can be general for the requirement of different cylinder diameters by only replacing a piston bush 2 with a different inner diameter (and the same outer diameter) (accordingly, the rubber seal ring 4 and the phenolic resin PF ring 3 are also replaced), and the unification and platformization of production manufacturing of the brake caliper body 1 are improved, thereby reducing the cost. Meanwhile, the anti-drag structure of automobile brake calipers uses the rubber seal ring 4 that is made of rubber and can elastically deform under pressure and the phenolic resin PF ring 3 that is made of high hydraulically sensitive phenolic resinous (bakelite) material at high pressure, and the phenolic resin PF ring 3 has the characteristics of stability at low hydraulic pressure and linear step at the pressure reaching the high hydraulic critical value, is stable at low pressure, and reaches high slope compression at high hydraulic pressure exceeding 30 bar. In use, the elastic potential energy of the rubber seal ring 4 can be stored through the chamfer 31 at the end face of the phenolic resin PF ring 3 jointed with the rubber seal ring 4 to trigger material characteristics at high hydraulic pressure, and the phenolic resin PF ring 3 is linearly compressed and elastically deforms in a stepped mode, which can increase the deformation amount of the rubber seal ring 4 and store more elastic potential energy of the rubber seal ring 4 so as to reduce the residual drag moment of the automobile brake and the fuel consumption, thereby achieving the purpose of emission reduction. To a certain extent, the problem of balance of performance between the liquid demand and the lag moment of the current automobile brake calipers at high hydraulic pressure is solved.

Wherein the brake caliper body 1 is a high-strength aluminum alloy part, and the outer surface of the brake caliper body 1 is attached with an anodic oxidation layer (not shown in the figure).

In this way, the automobile brake calipers are used in combination with the piston bush 2 made of high-strength aluminum alloy and anodized to improve wear resistance, which is beneficial to improvement of the life and safety of brake calipers and is conducive to lightweight and standardized design.

Wherein the step ring groove 21 is formed in one end of the piston bush 2 near the brake claw 12, and the minor diameter ring groove 23 embedded with the phenolic resin PF ring 3 is arranged in one side near the brake claw 12 in the step ring groove 21 (compared with the major diameter ring groove 22) so as to better ensure function effects; and the phenolic resin PF ring 3 is provided with an assembly opening 32 breaking the circumferentially continuous phenolic resin PF ring 3 for the convenience of assembly.

In this way, the phenolic resin PF ring 3 can be staggered in the assembly opening 32 and rebounds to a whole ring after being installed in the minor diameter ring groove 23 for the convenience of assembly.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

What is claimed is:

1. An anti-drag structure of automobile brake calipers, comprising a brake caliper body which is provided with a cylinder bore and a brake claw arranged along the axis of the cylinder bore in an extending mode, characterized in that a cylindrical piston bush is pressed in the cylinder bore by interference fit, a step ring groove is formed in the inner wall of the piston bush and composed of a major diameter ring groove and a minor diameter ring groove which have rectangular sections, the major diameter ring groove is embedded with a rubber seal ring with a section corresponding to the major diameter ring groove, the minor diameter ring groove is embedded with a phenolic resin PF ring with section corresponding to the minor diameter ring groove, and an inner edge of the end face of the phenolic resin PF ring joined to the rubber seal ring is provided with a chamfer.

2. The anti-drag structure of automobile brake calipers as claimed in claim 1, characterized in that the brake caliper body is an aluminum alloy part, and the outer surface of the brake caliper body is attached with an anodic oxidation layer.

3. The anti-drag structure of automobile brake calipers as claimed in claim 1, characterized in that the step ring groove is formed in one end of the piston bush near the brake claw, and the minor diameter ring groove embedded with the phenolic resin PF ring is arranged in one side near the brake claw in the step ring groove.

4. The anti-drag structure of automobile brake calipers as claimed in claim 1, characterized in that the phenolic resin PF ring is provided with an assembly opening breaking the circumferentially continuous phenolic resin PF ring for the convenience of assembly.

* * * * *